June 21, 1960  W. F. HUBBARD  2,941,818
LOAD ADJUSTING DEVICE FOR TRAILERS
Filed March 7, 1956  2 Sheets-Sheet 1
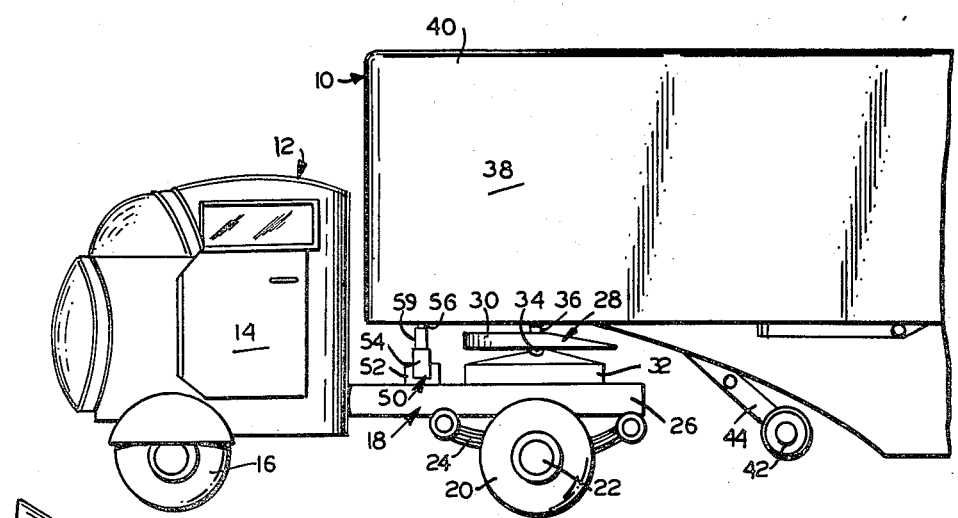
FIG.1
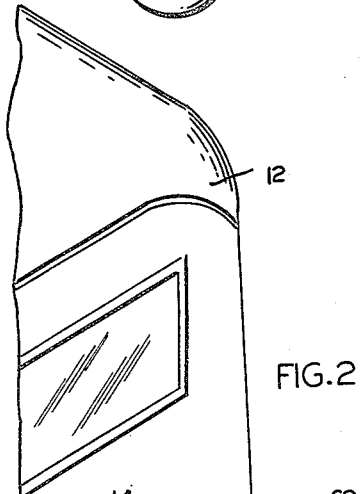
FIG.2
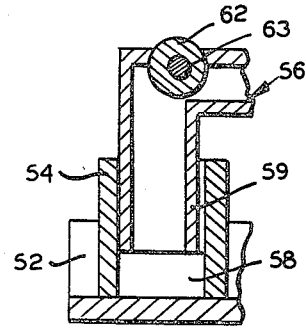
FIG.3
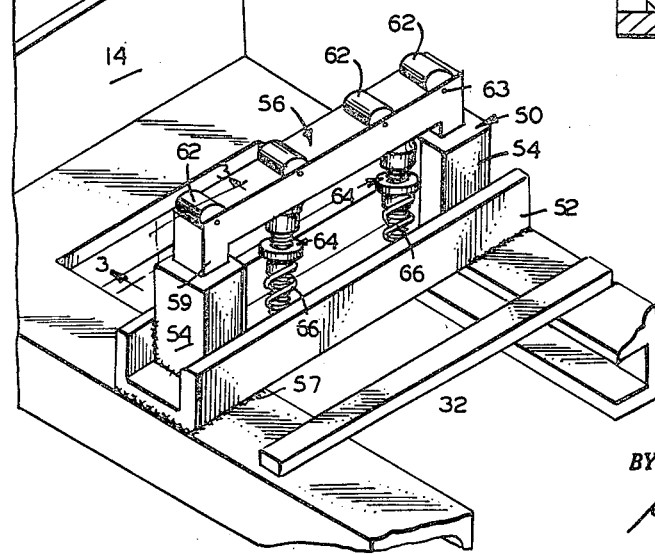
INVENTOR.
WESLEY F. HUBBARD
BY
ATTORNEY June 21, 1960   W. F. HUBBARD   2,941,818
LOAD ADJUSTING DEVICE FOR TRAILERS
Filed March 7, 1956   2 Sheets-Sheet 2

INVENTOR.
WESLEY F. HUBBARD

United States Patent Office 2,941,818
Patented June 21, 1960

2,941,818
LOAD ADJUSTING DEVICE FOR TRAILERS
Wesley F. Hubbard, 1780 Stewart Ave. SW., Atlanta, Ga.
Filed Mar. 7, 1956, Ser. No. 570,109
4 Claims. (Cl. 280—405)

This invention relates to a load adjusting device for trailers and particularly to such a device capable of being positioned and adjusted in conjunction with the load arrangement in a trailer in order to adjust the forces on the wheels of the lead vehicle for the main purpose of better distribution of the weight.

It is a common fault of trailers that the load distribution is poor and weight is improperly balanced, especially in the area around the connection between the trailer and the lead vehicle. A common fault in highway trailers is that the load is improperly balanced causing too much weight on the rear of the lead tractor vehicle. This is especially true with respect to the drive wheels of the tractor and it is at this particular point and set of wheels that state weights are made to see if maximum highway permissible loads are being exceeded. Oftimes the entire load is not excessive but either the load is not equal in the inside of the trailer or sometimes the nature of the load (viz. heavy machinery, airplane engines, and the like) is such that the weight because of inherent size and shape cannot be loaded equally on the wheels. Consequently, when highway officials make what is called "wheel" or "axle" checks they find that the drive axle is exceeding the proper amount and fines and sometimes even removal of the load are required.

There is a great need for a device which can be positioned in conjunction with and as a part of the tractor and trailer with means thereon to equalize and adjust the load and to maintain same under driving conditions and at rest. Further, such a device must be safe and without interference with the normal operation of the tractor. This invention presents such a device.

According to the present invention an adjustable force may be applied by selective adjustment to the trailer during or after loading, which adjustment remains set until the load is changed. This is done in the embodiment shown, and without any regards here to scope of invention or limitation of coverage, through the use of a movable trailer engaging beam member movable on the tractor near the fifth wheel connection, guide members holding this movable member near the fifth wheel arrangement, alignment means on said guide means, adjustable pressure members in the form of jacks which engage the movable member forcing same against the trailer according to selected pressure and position, and as additional safety factors the jacks are mounted on heavy coil springs which serve as shock absorbers. Also, as an added feature anti-friction rollers are provided on the movable member to engage the trailer for better relative movement therebetween as when the tractor makes a sharp turn.

A primary object of this invention is to provide a means of safely and effectively adjusting the trailer load for better load distribution on the wheels.

In line with this primary object is the invention with a provision for doing the adjustment without interference whatsoever with the normal operation of the tractor or trailer either in driving, stop, or turning positions thereof.

Another object resides in the construction permitting resiliency between the adjustable members.

A further advantage of extreme importance is the arrangement of the device which permits attachment to presently existing tractors for use with virtually any trailer and also its simple incorporation in new tractors as well.

Many other and further objects and advantages of my invention will be apparent from the following description taken in conjunction with the accompanying drawings, wherein:

Fig. 1 is a side elevation view of a conventional tractor-trailer truck with the invention in place forward of the fifth wheel thereof.

Fig. 2 is an isometric view of the invention mounted on the frame of the tractor and with a rear portion of the tractor and the entire trailer broken away.

Fig. 3 is a cross-sectional view of a detail of a connection taken along the lines 3—3 of Fig. 2.

Figure 4:
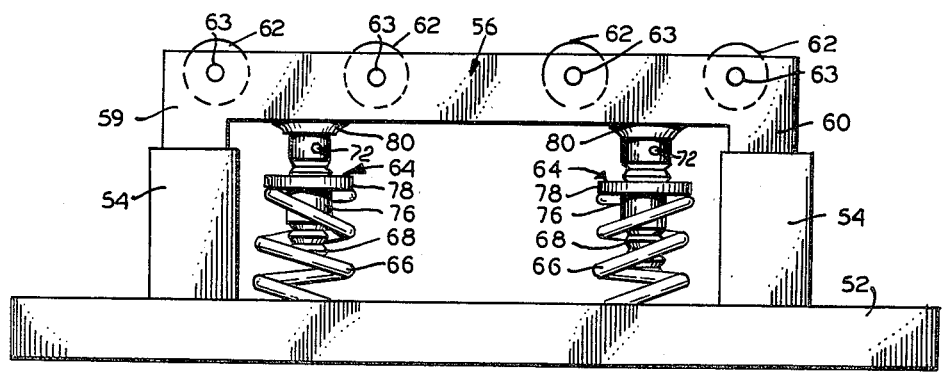
Fig. 4 is a front elevation view of the entire apparatus detached from the tractor.

Referring to the drawings and initially Fig. 1 thereof, my invention is particularly applicable to highway type trailer-tractor combinations or semi-trailers and the like and there is shown for illustrative purposes one such sample combination designated generally at 10 with a tractor 12 having cab 14, front wheels 16 on a rigid channel frame 18, drive wheels 20 supported by axle 22 on leaf springs 24. On and across the main channel beams 26 of the frame 18 at the rear thereof is a conventional so-called "fifth wheel" arrangement 28, such being the horseshoe-like plate arrangement 30 on a transverse frame 32 with transverse support shaft 34. According to such conventional arrangements there is some sort of pivot pin receiving slot or hole (not shown) in the plate 30 which receives the pivot retaining pin 36 on the trailer 38 and locks same into rigid but pivotal position through the means of some sort of mechanical latch mechanism the details of which do not form any part of this invention and no modification of the fifth wheel arrangement is necessary to this invention.

As shown in Fig. 1 the trailer normally rests by its pivot pin 36 in and on the fifth-wheel plate 30 with the forward end 40 of the trailer protruding partly over the rear end of the channels 26, the amount and proportion depending upon the particular design of the tractor and trailer. There is carried by the trailer 38 a pair of more of swingable wheels 42 on a frame 44 movably mounted beneath the trailer and selectively positionable on the ground when the trailer is not attached to the tractor.

My invention is designated generally as 50 and is located forward of the fifth wheel plate 30 and rearward of the cab 14 on the main channel beams 26 beneath the protruding portion 40 of the trailer 38 at that point. It includes a transverse channel beam 52 fixed on the frame 18 and in which is rigidly positioned for permanent placement a pair of upstanding support columns 54 which receive therein a transverse support beam member 56 engageable with the trailer front 40 as described hereinafter.

As is readily seen in Fig. 2, the transverse channel 52 is inverted across the main frame beams 26 and fixed, as by welding at 57, thereto. Support columns 54 are identical information and there are two of them spaced transversely of the frame, each generally rectangular in hollow cross-section and welded at several points to the inner faces of the transverse channel 52. Therefore, each column 54 has a respective internal socket 58 formed therein to receive a respective normally vertically disposed plunger end 59, 60 each formed as a respective bent end of transverse support beam member 56. Ends 59, 60 are confined closely but movable vertically in their respective sockets 58 and in absence of locking means may be moved freely either upwardly or downwardly. Disposed at the top of beam 56 longitudinally of the tractor and across the width of the beam are cylindrical rollers 62 spaced apart and journaled on the respective axle shaft 63 of each which is mounted on and across the top of beam 56. Each of the rollers has the periphery thereof protruding just enough to hold the trailer resting thereon off the beam 56 and each roller is an anti-friction device operable to reduce the friction between the trailer front and the beam 56.

Figure 5:
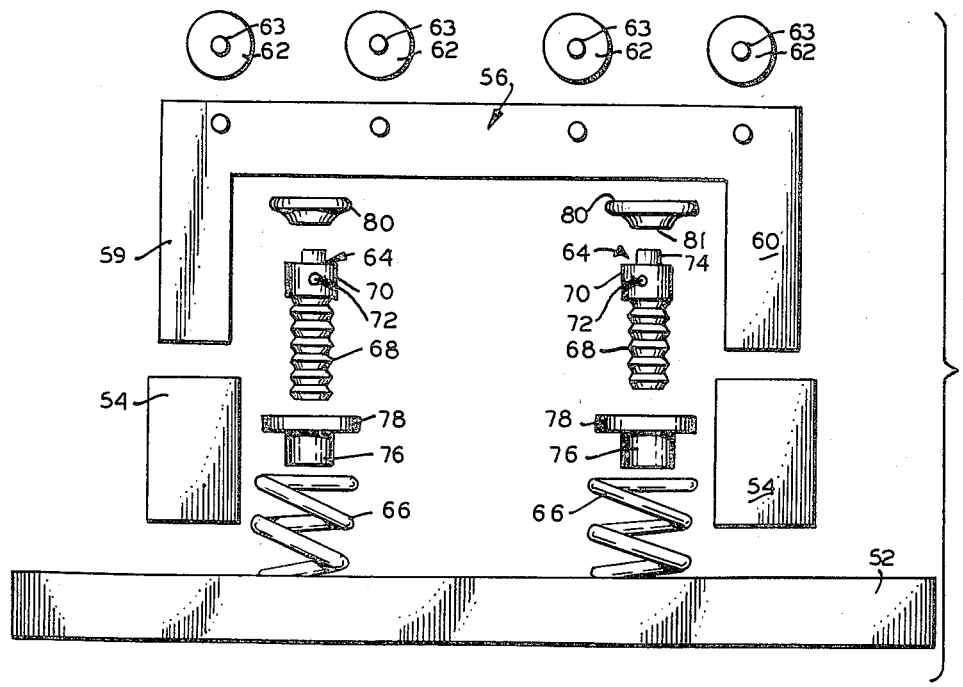
Fig. 5 is an elevation view in dis-assembly of the parts shown in Fig. 4.

The locking and adjustability of the beam 56 is achieved through a novel use of screw type jacks 64. A pair of jacks 64 are spaced apart between the inner faces of columns 54 and held in position thereat by means of a heavy respective coil spring 66 welded or otherwise secured to the bottom of channel 52. As is seen in detail in Figs. 4 and 5, screw jacks 64 each consists of a threaded heavy cylindrical screw shaft 68 having a cylindrical collar 70 secured at the top thereof with a hole 72 in the collar 70 to receive secured at the top thereof with insertion therein an actuating rod (not shown) placed through the hole enough to be turned; and collar 70 has a round protrusion 74 at the top thereof. An internally screw threaded circular collar 76 widening into a circular flange 78 rests against the top of and with collar 76 inserted down into coil spring 66 which in turn, as stated above, is welded to the channel 52. Therefore there is a mechanical advantage pressure adjustment through the screw action between the threaded collar 76 and the matching threaded shaft 68. In addition, the setting and re-setting of the pressure adjustment is automatically locking to prevent relative movement between the shaft 68 and collar 76 since heavy rotational force is needed to move them apart and this requires the use of the actuating rod. The top of each jack has a cup-like disc head 80 with a circular bottom with bore 81 into which fits the protrusion 74 of its respective screw shaft 68. Screw shaft 68 threadedly engages inner threads in collar 70.

The jacks 64 are located with their respective heads 80 normally engaging and supporting the freely movable beam 56 so that the beam ends 54 are prevented by the jacks from moving downwardly but have freedom upwardly against the underside, front of the trailer 38. The beam 56 is normally disposed against the underside of the trailer forward end 40 substantially the full width thereof, and beam 56 in turn is supported on and by the heads 80 and the remainder of the jacks 64 resiliently mounted on the springs 66. Springs 66 are quite heavy and have sufficient strength to withstand and permit the jacks to exert force on the beam 56 against the underside of the trailer with the channel beam 52 supporting springs 66 thereby shifting moments about the rear axle 22 and the fifth wheel pin 36 enough to balance the load. Therefore, the springs 66 are made too heavy and stiff for any normal material displacement as a result of the jacking of the jacks 64 but have sufficient resiliency to give and to absorb sudden and hard shocks of the road as well as abnormal sway of the trailer.

In loading the trailer with my device the preferred procedure would be to place the load according to space and then adjust the jacks 64 while the wheels are on a scale to the best balance and axle load. This setting would remain fixed under the normal driving position and would be the same when weighing in at any station along the line.

Installation is simple and can be done on almost any type of tractor. The additional weight of the device is not of any importance and the safety of the apparatus and the tractor-trailer rig is increased.

In presenting this device I have illustrated in the drawings and described in detail one preferred form of the invention but this is not to be construed in any way as the only way of doing this or any sort of limitation on my device since various alterations, substitutions, modifications, eliminations, changes, reversals and other changes may be made in the disclosed embodiment without departing from the scope of my invention as defined in the appended claims made a part hereof and to be construed by proper interpretations.

I claim:

1. In a load adjusting and balancing device normally operating between a lead vehicle and a towed following vehicle such as a tractor pulling a trailer through a connection therebetween, a rigid base support on said lead vehicle, a pair of upstanding guide and retaining members each having a socket portion adapted to receive and confine a beam therein, a transverse beam trailer front underside engaging member extending between and supported by said upstanding guide members, depending end portions on each end of said beam member, each partly confined in said socket portion of a respective upstanding guide member, said transverse beam being movable upwardly and downwardly from the ends of same moving in its respective guide member, a pair of jack members on each side of said base adjacent a respective guide member, and resilient means resiliently supporting said jack members, whereby said trailer engaging member may be selectively adjusted upwardly or downwardly in said guide members.

2. The device of claim 1 wherein said transverse beam has anti-friction means mounted on the top thereof for engaging said trailer.

3. The device of claim 1 wherein said resilient means is located between said trailer engaging member and said base support.

4. In a load adjusting and balancing device normally operating between a lead vehicle and a towed following vehicle such as a tractor pulling a trailer through a connection therebetween, a rigid base support on said lead vehicle, a pair of spaced, upstanding guide and retaining members each having a guide portion adapted to receive and guide part of a beam therein, a transverse beam trailer front underside engaging member extending between and movably connected with said upstanding guide members, end portions on each end of said beam member and each movably connected in said guide portion of a respective upstanding guide member, said transverse beam being movable upwardly and downwardly with the ends of same connected with and moving in its respective guide member, at least one jack member on the inside of said base between the guide members, and resilient means resiliently supporting said jack member, whereby said trailer engaging member may be selectively adjusted upwardly or downwardly in said guide members.

References Cited in the file of this patent

UNITED STATES PATENTS

| | | |
|---|---|---|
| 1,391,864 | Stanbrough | Sept. 27, 1921 |
| 2,328,387 | Meats | Aug. 31, 1943 |
| 2,360,901 | Simmons | Oct. 24, 1944 |
| 2,391,372 | Weigand | Dec. 18, 1945 |
| 2,727,755 | Hume | Dec. 20, 1955 |